(12) United States Patent
Asmus

(10) Patent No.: US 6,277,202 B1
(45) Date of Patent: Aug. 21, 2001

(54) METHOD AND APPARATUS FOR UTILIZING A LASER-GUIDED GAS-EMBEDDED PINCHLAMP DEVICE

(75) Inventor: John F. Asmus, La Jolla, CA (US)

(73) Assignee: Environmental Surface Technologies, Norcross, GA (US)

( * ) Notice: Subject to any disclaimer, the term of this patent is extended or adjusted under 35 U.S.C. 154(b) by 0 days.

(21) Appl. No.: 09/140,645

(22) Filed: Aug. 26, 1998

Related U.S. Application Data (60) Provisional application No. 60/057,103, filed on Aug. 27, 1997.

(51) Int. Cl.⁷ ................................ B08B 7/00; B08B 5/00
(52) U.S. Cl. .................................. 134/1; 134/21; 134/38
(58) Field of Search ................................ 134/1, 1.7, 1.2, 134/1.3, 38, 21; 250/492.1; 219/121.36, 121.37, 121.43, 121.38, 121.6, 121.85

(56) References Cited

U.S. PATENT DOCUMENTS

| | | |
|---|---|---|
| 4,368,080 * | 1/1983 | Langen et al. ............... 134/1 |
| 4,450,568 | 5/1984 | Asmus . |
| 4,867,796 | 9/1989 | Asmus et al. . |
| 4,889,605 | 12/1989 | Asmus . |
| 4,994,715 | 2/1991 | Asmus et al. . |
| 5,079,187 | 1/1992 | Asmus et al. . |
| 5,204,506 | 4/1993 | Asmus et al. . |
| 5,656,096 * | 8/1997 | Van Alstyne ............... 134/1 |

OTHER PUBLICATIONS

Asmus, John F., Pulsed Light Coatings Removal: Flashlamp, Pinch–lamp and Thermal Release Coatings, published in DOD/Industry Advanced Coatings Removal Conference, Orlando, Florida May 19–21 1992.

Asmus, et al., "Gas–Embedded Pinch Controlled Switching" published for "Star Wars" conference open to public and mailed out to attendees, No date available.

Auguste, T. et al., "Dynamics of an argon gas–embedded Z–pinch micro–channel as a function of the initial preionization" in the Laser and Particle Beams (1989), vol. 7, part 4, p. 781.

* cited by examiner

*Primary Examiner*—Alexander Markoff
(74) *Attorney, Agent, or Firm*—Todd Deveau; Ryan A. Schneider; Troutman Sanders LLP (57) ABSTRACT

A method and apparatus for the removal of coatings from surfaces utilizing UV energy. Preferably, the use of a laser-guided gas-embedded pinchlamp is utilized to remove paint coatings from aircraft surfaces. In a preferred form, the present invention provides a gas-embedded laser-guided pinchlamp device that, in operation, reduces toxic waste bi-products and can remove surface paint, in particular aircraft surface paint, or other coatings at a higher efficiency than all other alternative methods implemented or investigated to date. The present invention may preferably comprise eight distinct support systems; a plasma pinchlamp chamber, a power supply, a laser system, a gas supply system and coolant system, an optical reflector, a debris collection system for containing and catching toxic effluvients, an encasement device to contain effluvium in conjunction with the collection system, and a pinchlamp positioning system. It should be noted that the present invention need not incorporate all these systems in an operable embodiment. A gas-embedded laser-guided pinchlamp device is generally described in U.S. Pat. No. 4,450,568 to Asmus which patent and description of a pinchlamp device are incorporated herein by reference as if fully described herein.

19 Claims, 4 Drawing Sheets

METHOD AND APPARATUS FOR UTILIZING A LASER-GUIDED GAS-EMBEDDED PINCHLAMP DEVICE

This application claims benefit to Provisional Application No. 60/057103 filed Aug. 27, 1997.

BACKGROUND OF THE INVENTION

1. Field of the Invention

The present invention relates generally to a method and apparatus for treating surfaces, such as for the removal of coatings and contamination from that surface. In particular, this invention relates to a method and apparatus utilizing a laser-guided gas-embedded pinchlamp device for surface treatment. The present invention is an improvement over prior flashlamps, used, for example, for the removal of coatings.

2. Description of Related Art

The transfer of heat to surfaces to facilitate surface treatment and/or the removal of coatings is well known. In recent decades, this transfer has been completed through the use of propane, kerosene, and acetylene torches, as well as electrical heat guns, quartz-halogen lamps, and high pressure concentrated arc lamps employing noble gases. These approaches to coating divestment from a surface deposit energy in the coatings at typical heating rates ranging from 100 to 1000 $W/cm^2$. However, at such low heating rates, it usually requires many seconds of residence time to destroy a coating's adhesion or integrity, facilitating the convenient removal of any residual debris such as ash. A disadvantage to such approaches is that all but the most durable substrate materials employed in structures, for example steel or concrete, suffer unacceptable thermal damage. A further disadvantage to such low-temperature pyrolysis processes, is that these treatments frequently expel large quantities of highly toxic vapors and smoke.

Since the early 1960s, the ruby laser has been utilized to create higher heating rates than those above, rates approaching $10^4$ to $10^6$ $W/cm^2$. At these heating rates, the sublimation, ablation, spallation, dissociation, or pyrolysis wavefront eating into the coating may overtake the thermal conduction wave that heats the substrate, and therefore, very little net substrate heating occurs.

In the 1970s, Nd:YAG laser systems in the 1–10 Watt average power range were employed in a number of specialized, high-valued applications for coating removal. Some twenty years ago, the customer was willing to pay the coating removal costs of $100/ft^2$ or more, and was amenable to the manual control of these techniques. Later, the photon generator of choice was the $CO_2$ laser. As the $CO_2$ laser was economical and successfully scaled to kW power ranges, it began to be used in automated paint stripping situations. Gas lasers, such as the $CO_2$ laser, tended to be rather large and bulky, a disadvantage in such paint removal applications. As a second disadvantage, the infrared wavelength generated by a $CO_2$ laser did not lend itself to coating color discrimination and fiberoptic beam delivery which compounded the size problem.

By the mid 1970s, optical radiation from a pair of 9 mm-bore, 12 inch long linear xenon flashlamps driven by an available plasma containment power supply at the University of California, San Diego was utilized to strip paint from an historic, oilcloth surface. The flashlamp-charred, overpaint residue left on the surface after coating removal, was manually removed from the set cushions with a mild alcohol solution.

By the mid-1980's, flashlamp technology had evolved such that efforts were underway to attempt the construction of a commercially viable flashlamp paint stripping system. This system was later abandoned. Problems arising from this effort revealed that the ash residue left by the treatment still had to be removed by hand. Further, the various designs of the flashlamps, reflectors and airflow systems were such that they required the frequent cleaning of hard to reach, difficult surfaces. Their performance also began to significantly decline after approximately 10,000 flashlamp pulses, thereby necessitating frequent bulb replacement. Finally, in order to achieve a commercially desired stripping rate, the system had to be operated at a higher than anticipated pulse repetition rate, approximately 6 Hz, where such use caused some substrate materials to overheat.

In response to the deficiencies of flashlamp technology, the next generation of high-power radiation resources evolved, that being the pinchlamp. The gas-embedded pinchlamp differs from the flashlamp in that a beam from a very small laser is used to initiate the plasma 'pinch' within the enclosed pressurized gas, wherein the hot radiating plasma created is prevented from contacting the containment vessel, typically a transparent quartz envelope. The pinchlamp's unique design has been used for nuclear waste remediation and chemical weapons neutralization.

An example of this technology is Pumping a Photolytic Laser Utilizing a Plasma Pinch, U.S. Pat. No. 4,450,568 to Asmus. This particular pinchlamp device requires a laser medium within the quartz tube, an element that is not needed in the present invention. Currently, experimental pinchlamps typically are some 10–100 times more intense than the prior art flashlamps. The gas-embedded pinch device typically comprises a high pressure argon gas contained within a large quartz tube. A beam from a very small laser is directed down the axis of the tube and creates a straight and narrow, generally 5 mm in width, conductive path for a high power electrical discharge. The electrical discharge heats the dense argon channel to a very high temperature and thereafter, large amounts of radiation are produced without the plasma coming into physical contact with the quartz wall, which would destroy the wall. Typically, laser-guided gas-embedded pinchlamps operate on a single shot basis. No significant attempt has been undertaken to fabricate a device having a repetition rate of between 5–10 Hz in this particular technology, as is accomplished by the present invention.

Liquid-jet pinchlamps, like the gas-embedded pinch, have been utilized for various purposes. The liquid pinch comprises the shooting of a thin stream, generally 100 um, of liquid decane into a vacuum chamber. As the decane traverses the chamber, a small amount of the liquid evaporates, creating a tenuous vapor cloud around the jet. Then a high electrical potential is applied from one end of the jet to the other and a small electrical current flows through the cloud. The UV radiation from the cloud heats the liquid to the point of electrical conduction. Then a very large electrical current flows through the newly created conducting liquid, and heats it to very high temperatures so that high-intensity radiation is produced.

Unlike the liquid jet pinchlamp, the laser-guided gas-embedded pinchlamp is free of the vacuum pumping element of the liquid-jet pinch device. See, for example, U.S. Pat. No. 4,889,605 to Asmus. Yet, it does depend on a small laser for control. The laser-guided gas-embedded pinch device is scaleable to a range of about 500–1000 kW average power, whereas the liquid-jet pinch is limited to about 40 kW average power. The higher output of this device indicates that it is vastly more effective than flashlamp light in coupling to surfaces and inducing profound effects. With the pinchlamp's small effective source size, it may be imaged so as to produce these effects at a much greater standoff distance than the flashlamp (10–20 cm). The ability to operate in open-air environments makes this far more versatile technology than liquid-jet pinch devices which are limited to operating in a vacuum environment.

Current aircraft paint strip rates using chemicals are up to 8 to 12 square feet per minute, at a thickness at approximately 3 mils overall. This excludes composite material surfaces which need to be masked during chemical application and then sanded separately. In order to make an optical system economically feasible, this strip rate of 8 to 12 square feet per minute is unacceptable in some instances. A device that can paint strip at approximately 15 to 30 square feet per minute, including the stripping of composite substrates, is required for advanced high-performance military aircraft. Further, the removal of paint and coatings must be performed without damage to the substrate, and it is most desirable that depth of removal be controlled. Additionally, a deployable system if used, must be robust and reliable, and must further be operationally cost competitive with available systems.

Thus, it can be seen that there is a need for the present invention, an improvement over the prior art removal systems, including plastic media blasting, wheat blasting, and more recently, the flashlamp. It is the provision such an apparatus that the present invention is primarily directed.

SUMMARY OF THE INVENTION

Briefly described, in a preferred form, the present invention overcomes the above-mentioned disadvantages by providing a gas-embedded laser-guided pinchlamp device that, in operation, reduces toxic waste bi-products and can remove surface paint, in particular aircraft surface paint, or other substances at a higher efficiency than all other alternative methods implemented or investigated to date. Further, the present pinchlamp may also be used for initiating bio-catalyst reactions and photocuring surfaces.

The present invention may preferably comprise eight distinct systems; a plasma pinchlamp chamber, a power supply, a laser system, a gas supply system and coolant system, an optical reflector, a debris collection system for containing and catching toxic effluvients during treatment, an encasement device to contain effluvium in conjunction with the debris collection system, and a pinchlamp positioning system.

The plasma pinchlamp chamber generally comprises pressurized gas in a large transparent tube. The hot radiating plasma created during use is prevented from coming into contact with the transparent tube because of the "pinch" caused by the ionization of the gases directly effected by a laser beam which creates a conductive path for a high powered electrical discharge from the electrodes. The beam from a very small laser described hereinafter, is directed down the axis of the tube creating a straight and narrow conductive path for the high electrical discharge to follow.

The plasma pinchlamp chamber preferably comprises a sapphire window, instead of the prior art quartz window, in the preferred embodiment of the present invention. The use of sapphire, instead of quartz, is particularly desirable for the following reasons: a higher power is attainable without envelope failure, it is a better UV optical transmitter, it can withstand higher temperatures, and a shorter wavelength of light is allowed to pass than is allowed utilizing a traditional quartz window.

The pinchlamp may ether incorporate an electrical polarity that is the reverse of that of prior art devices. Conventionally, the electrode with the hole in it had been the cathode. In the preferred embodiment, this electrode is the anode. This embodiment removes the need for an eternal electrical switch which had been required in the prior art devices.

The power supply of the present invention is preferably capable of delivering a pulse of energy of 1–10 kilojoules of a duration of approximately 10–30 microseconds and 10 milliseconds between pulses (30 Hz). Generally, this is a power supply requirement of one ampere at 30 kilovolts. In a preferred embodiment, the power supply may be connected to a "house" supply of 440 volts, three phase; or 230 volts at 100 ampere, three phase.

The laser system of the present invention preferably comprises a small laser with a beam of about 4–7 mm. The laser system forms the "pinch" on the gas that populates the transparent tube.

The present invention may further comprise a gas supply system and coolant system. Preferably, the gas is an argon gas. This system provides cooling to the internal regions of the cylinder.

In order to utilize the present invention for effective surface preparation, the UV radiation emitted from the plasma pinch must be collected in an efficient manner and concentrated on the surface to be treated. The present invention may comprise several reflecting types of optical reflectors, wherein the shape of such reflector determines the focal spot characteristics.

The present invention may also comprise a debris collection system employing preferably, flowing helium gas. This system efficiently removes the effluvients, by trapping, compressing and storing the stripped toxic particulates and has less absorption of the pinch radiation than air.

A encasement device, preferably a contourable hood, may be added to the present invention which seals off the immediate work area optically, acoustically, and mechanically, which allows other maintenance work to proceed without endangering maintenance personnel, and further safely captures the effluence.

The present invention may further comprise a positioning system, for increased efficiency, safety and economy. The positioning system preferably incorporates a manipulator, a computer system, a base that supports all the direct support systems for the pinchlamp, and a control system based on hybridization of model-based and sensor-based control.

The manipulator is that system which places the pinchlamp device in proximity to the surface and coating. The manipulator may be both manually and computer controlled with the built-in capability of being totally controlled by the computer system and over-rideable at all times by a human observer.

The computer system is preferably a PC-based, -486 or -586 processor with sufficient RAM and hard storage memory to meet the present invention's requirements including electrical fault sensing and emergency shutdown.

The positioning system may further comprise a mobile base capable of supporting all the direct support systems or conduits to and from components of the direct support systems for the pinchlamp device of the present invention.

The positioning system of the present invention may further comprise a fully integrated control system which is based on hybridization of both model-based and sensor-based control for automated path planning with optical avoidance. The above computer system will accept input information from a video vision system to monitor and control the surface scanning rate.

It will be apparent to those skilled in the art that the present invention is applicable to a wide range of usages, and is not limited to the present preferred embodiments.

Therefore, it is an object of the present invention to provide a method and apparatus utilizing a laser-guided gas-embedded pinchlamp device. In the preferred embodiment, this device will be utilized for paint stripping, paint removal, or other coating and contamination removal processes. In an alternate embodiment, laser-guided gas-embedded pinchlamps may be utilized in aseptic packaging and medical devices, methods for food preservation, large-area metals and ceramic glazing, semiconductor annealing, and biochemical decontamination.

Accordingly, it is an object of present invention for a device and method capable of operation in the incoherent light spectrum whereby significant quantities of heat are generated and can be directed to a particular surface such that the high energy, microsecond light emitted from pinchlamp results in a mechanical mechanism whereby the ionization and heating of the air immediately above the coating surface creates a shock wave which spalls the coating from the substrate.

It is a further object of the present invention for a device incorporating a laser-guided gas-embedded pinchlamp device capable of having a scaleable power range from 50–300 kW average power.

It is an additional object of the present invention for a device and method for utilizing a pinchlamp in connection with a system for removing debris upon utilizing the pinchlamp.

Another object of the present invention is to provide for a means of surface treatment wherein a coating may be removed from a surface without appreciably increasing the temperature of the underlying substrate.

A further object of the present invention is to provide a pinchlamp device with an increase in repetition rate, so that it may be used in commercial applications.

Still another object of the present invention for a device and method utilizing laser-guided gas-embedded pinchlamp technology for food preservation, aseptic packaging and medical devices, large-area materials glazing, semiconductor annealing, and biochemical decontamination as well as chemical decontamination.

Yet another object of the present invention is for a device and method utilizing laser-guided gas-embedded pinchlamp technology comprising a means for cooling the argon, the utilization of a reflector, a hood, a manipulator, a computer system, a mobile base, and a control system to have a system for coating removal of surfaces.

It is another object of present invention to create a device utilizing a laser-guided gas-embedded pinchlamp, with certain improvements made thereto, which allows for the economical treatment of surfaces.

Another object of the present invention is to provide a method and apparatus of using a laser-guided gas-embedded pinchlamp device including a cooling mechanism for the embedded gas.

Still another object of the present invention is to provide method and apparatus utilizing laser-guided gas-embedded pinchlamp technology including a system for placing the energy created by the laser-guided gas-embedded pinchlamp device in close proximity to a particular surface to be treated.

A need exist to have a more powerful source of high-intensity radiation in the form of incoherent light.

These and other objects, features, and advantages of the present invention will be more apparent upon reading the following specification in conjunction with the accompanying drawing figures.

DETAILED DESCRIPTION OF THE PREFERRED EMBODIMENTS

Figure 1:
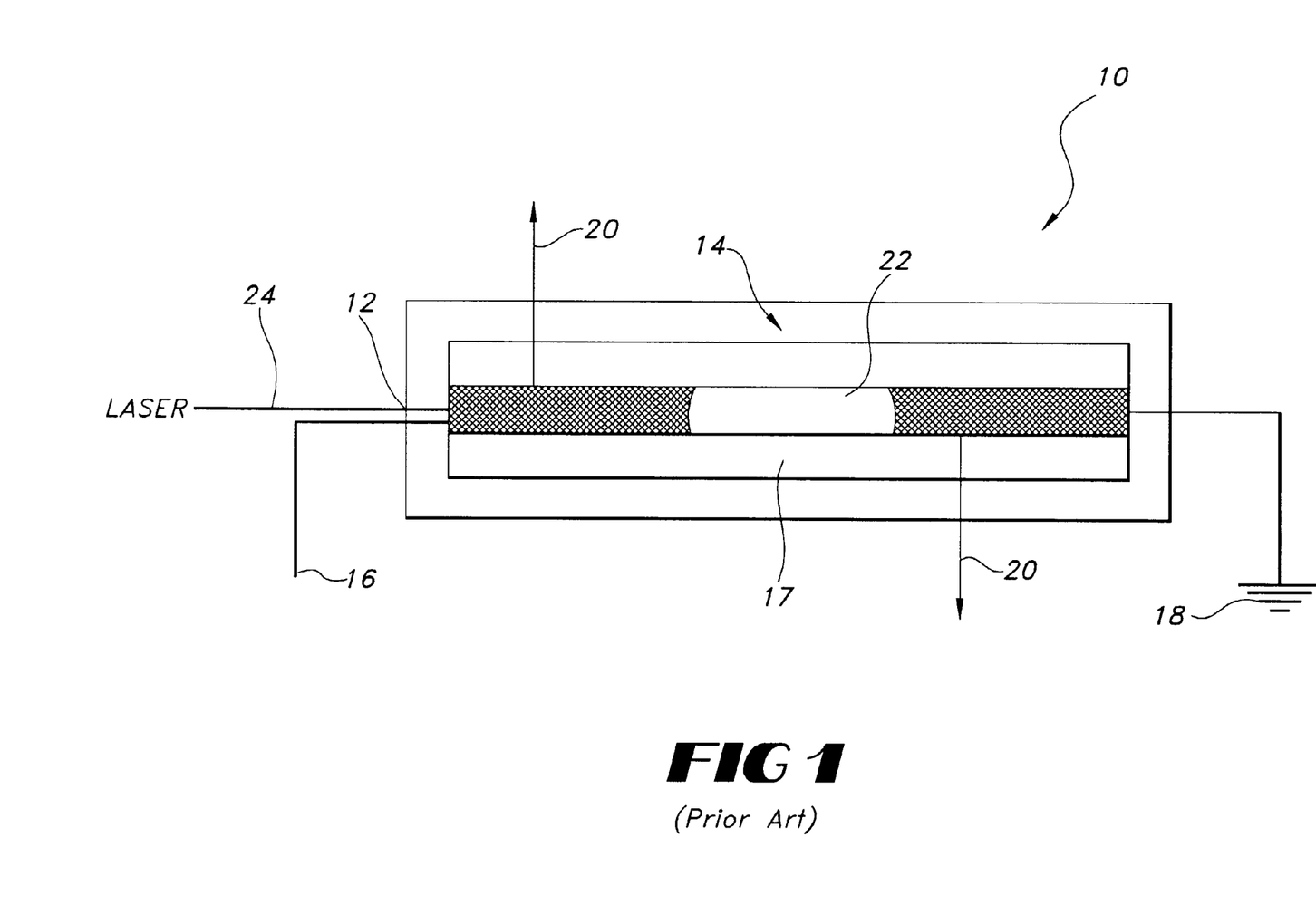
FIG. 1 is a perspective view of a laser-guided gas-embedded pinchlamp known in the art.

Referring now in detail to the drawing figures, wherein like reference numerals represent like parts throughout the several views, FIG. 1 illustrates a laser-guided gas-embedded pinchlamp 10.

In a preferred form, the present invention provides a gas-embedded laser-guided pinchlamp device that, in operation, reduces toxic waste bi-products and can remove surface paint, in particular aircraft surface paint, or other coatings at a higher efficiency than all other alternative methods implemented or investigated to date. The present invention may preferably comprise eight distinct support systems; a plasma pinchlamp chamber 10, a power supply 100, a laser system 24, a gas supply system and coolant system 110, an optical reflector 120, a debris collection system 130 for containing and catching toxic effluvients, an encasement device 140 to contain effluvium in conjunction with the collection system, and a pinchlamp positioning system 200. It should be noted that the present invention need not incorporate all these systems in an operable embodiment. A gas-embedded laser-guided pinchlamp device is generally described in U.S. Pat. No. 4,450,568 to Asmus which patent and description of a pinchlamp device are incorporated herein by reference as if fully described herein.

As shown in FIG. 1, the plasma pinchlamp chamber 10 comprises a pressurized gas 17 in a large transparent tube 14. The hot radiating plasma 22 created during use is prevented from coming into contact with the transparent envelop 14 because of the "pinch" caused by the ionization of the gases 17 directly effected by, preferably, a laser beam which creates a conductive path for a high powered electrical discharge from the electrodes 16, 18. Preferably, the pinchlamp 10 comprises pressurized argon gas 17, at between 2–4 atm, contained within the transparent tube 14. Argon gas is both economical and electron donating. It should be appreciated that, for example, air, neon, xenon, krypton, and other gases may be also used. The beam from a very small laser 24 is directed down the axis of the tube 14 creating a straight and narrow conductive path for the high electrical discharge to follow. The electrical discharge heats the dense argon, which remains pinched into a narrow channel, to a very high temperature of generally 28,000° F., wherein copious amounts of radiation is produced. If the plasma 22 were to come into physical contact with the wall of the tube 14, the wall would be destroyed.

The plasma pinchlamp chamber 10 preferably may comprise a sapphire window 12, instead of the prior art quartz window, in the preferred embodiment of the present invention. The use of sapphire, instead of quartz, is particularly desirable for the following reasons: a higher power is attainable without envelope failure due to internal shockwaves, better UV light optical transmission, it can withstand a higher temperature, and a shorter wavelength of light is allowed to pass than is allowed utilizing a traditional quartz window. Specifically, quartz will allow the transmission of light greater than 170 nanometers (nm) in wavelength. Sapphire, on the other hand, allows for the transmission of light greater than approximately 150 nanometers (nm) in wavelength. The additional spectrum allowed to be utilized by the incorporation of a sapphire window 12 provides for more light to be transmitted from the window into the reflector 120. Because more light enters the reflector 120, more energy is transmitted to the treated surface 210 creating a more highly efficient system.

It will be apparent to one skilled in the art, that many other materials may comprise the window 14 of the present invention. Such materials will comprise those qualities of quartz and sapphire, and improve upon these characteristics. While such strength, refractory, temperature control and UV transmission is not generally found in glass, but is found in many other materials. Further, these materials are generally less cost efficient as the present time.

The chamber 10 may also comprises a separate focusing lens, not shown. In the preferred embodiment, the window 14 is also shaped as this focusing lens, but it will be apparent that the focusing lens may comprise a separate element. The focusing lens focuses the laser beam to the diameter of the pinch, preferably generally 1 mm.

The pinchlamp 10 may further be configured to reverse the polarity of the electrodes 16, 18, unlike the prior art devices. Conventionally, the electrode with the hole in it had been the cathode. In the preferred embodiment, this electrode is the anode. This embodiment removes the need for a switch which adds complexity and limits the performance of the system. Such reversal still creates the ionization process within the gas 17, but additionally causes the emission of electrons upon impact with the cathode, producing sparks, and therefore more electrons, which further stimulate the transmission of current and the generation of the pulse without the need for a switch.

The power supply 100 of the present invention is preferably capable of delivering a pulse of energy of 0.1–10 kilojoules of a duration of approximately 10–30 milliseconds and 10 milliseconds between pulses (30 Hz). Generally, this is a power supply requirement of one ampere at 30 kilovolts. In a preferred embodiment, the power supply may be connected to a "house" supply of 440 volts, three phase; or 230 volts at 100 ampere, three phase.

The power supply 100 of the present invention further includes a pulse forming network, (PFN), or energy storing device. Prior art devices utilized a series of capacitors to create the high peek pulse power required of those machines. The present invention utilizes a lower energy of generally 15 kilovolts, limited to less than 20 kilovolts, although more energy may be used depending on the embodiment. The PFN may be similar to that described in the '568 patent. However, since a lower voltage output is required in the present invention, a single capacitor, as opposed to a bank of capacitors, will suffice. In addition, because of the reversal of polarity described herein, the switches in PFN of the '568 patent are not required.

The laser system 24 of the present invention preferably comprises a small laser. The laser system initiates the "pinch" on the gas that populates the transparent tube. The laser system preferable creates a pulse length of approximately 8 nm, with a wavelength of approximately 1.06 micrometers. The laser 24 of the present invention preferably operates at 30 millijoules, but may work at as much a 450 millijoules. The laser beam is preferably 4–7 mm. Pulse length, wavelength, and energy of the laser 24 are variable. The laser system 24 of the present invention both creates the ionization channel, and, in lieu of the prior art switches, also switches the power supply. Therefore, the present invention is a self-switch device.

The present invention may further comprise a gas supply system and coolant system 110. This system 110 provides cooling to the internal regions of the cylinder 14 at generally a volume of four 4 liters at a pulse charge rate of 30 pulses/second, which requires 10 cubic feet per minute of gas flow assuming worst case ambient air temperature of 100° F. System 110 maintains 5 psi head and the encasement including the tube 14 surrounding the pinch 10 and arc are able to withstand 100 psi static. Preferably, the present invention operates at 50 psi.

In preferred form, the system 110 is a closed-system argon gas supply and coolant system.

In order to utilize the present invention for effective surface preparation, the UV radiation 20 must be collected in an efficient manner and concentrated on the surface 210 to be treated. The present invention may comprise several types of optical reflectors 120, wherein the shape of such reflector 120 determines the area of concentration or focal spot. These include reflecting cylinders, spheres, and ellipsoids. In its preferred embodiment, the present invention comprises and ellipsoid optical reflector 120.

Figure 2:
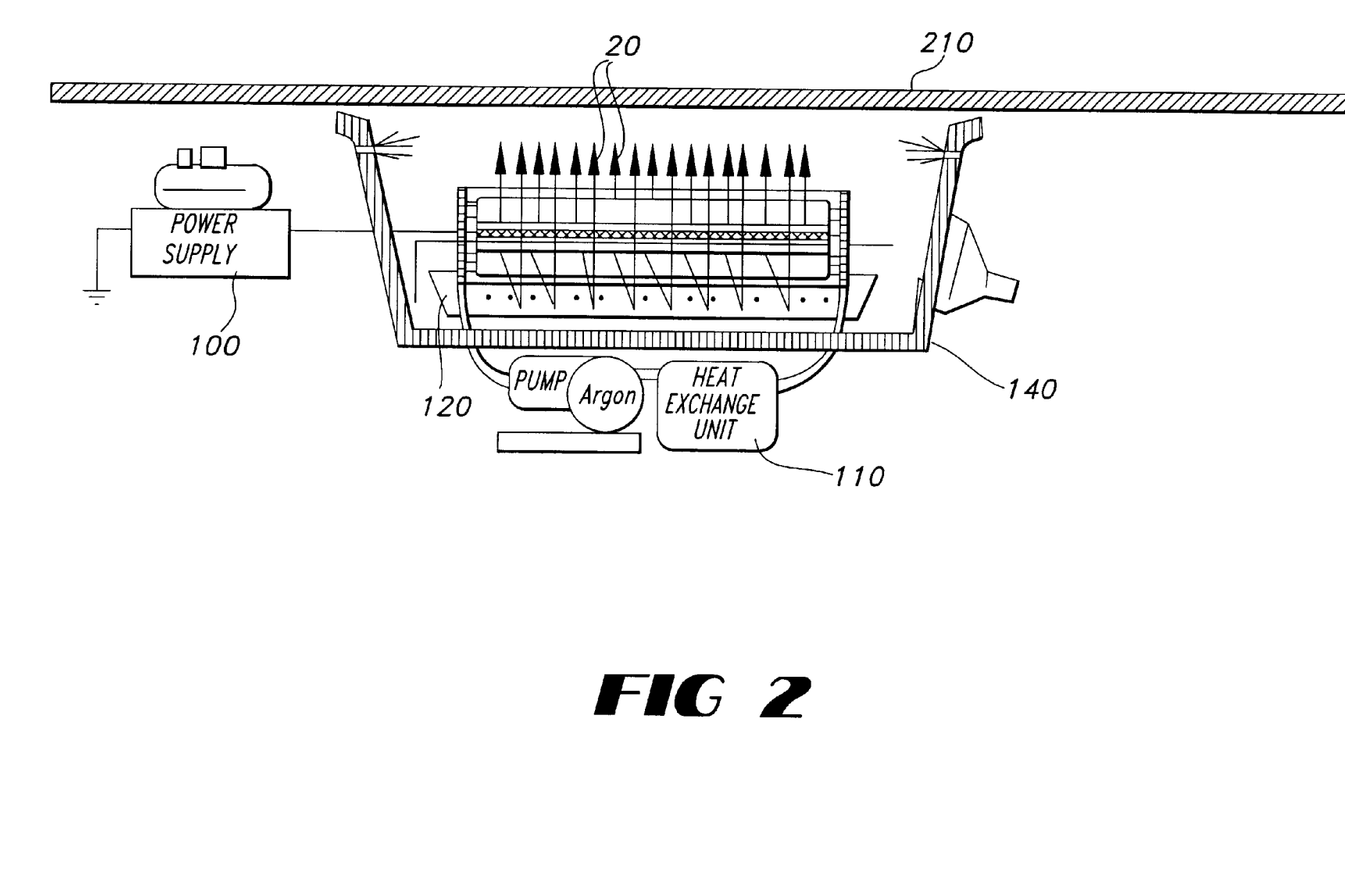
FIG. 2 is a side-on perspective view of an embodiment of the present invention in close proximity to a surface.
Figure 4:
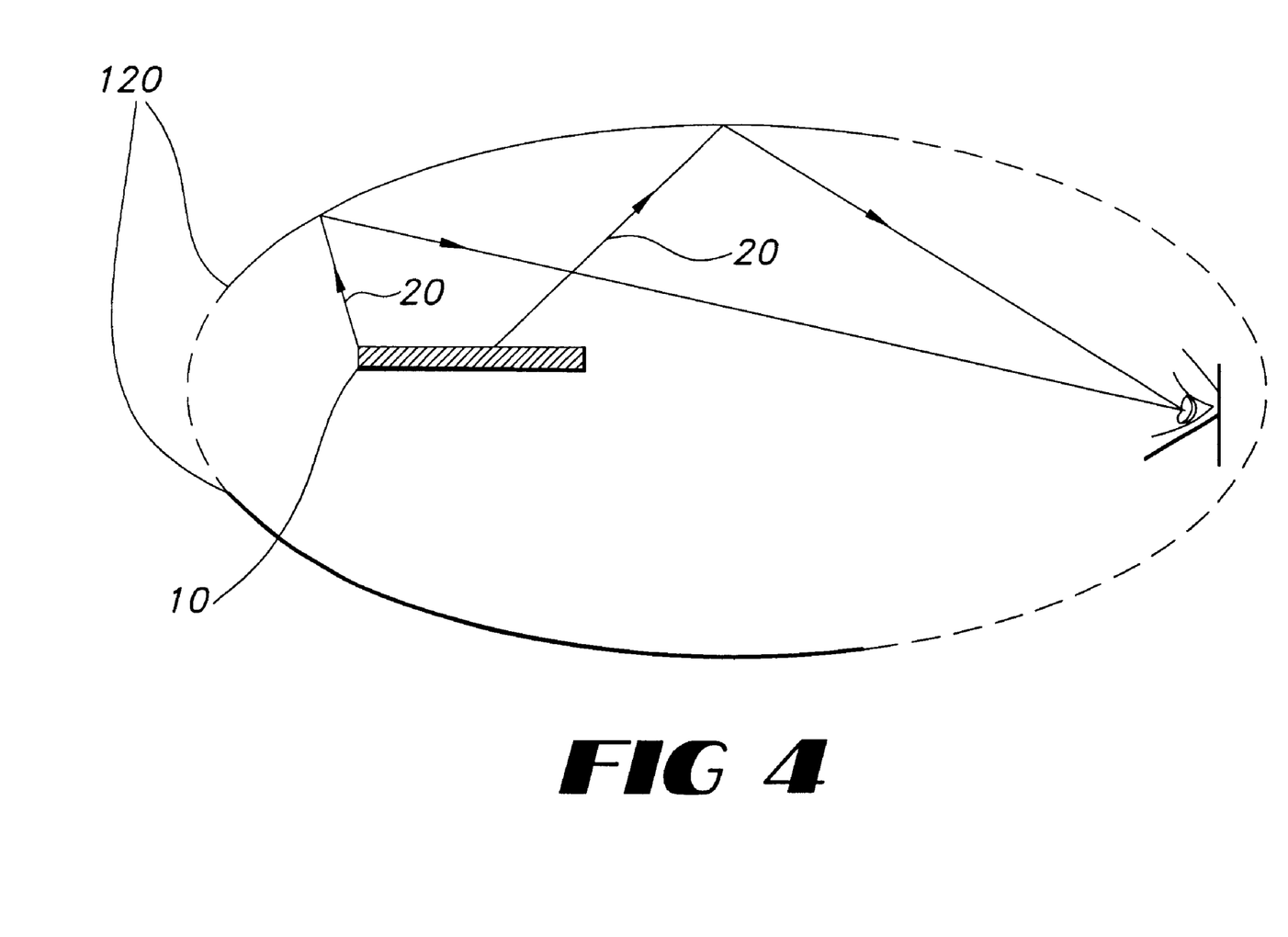
FIG. 4 is a end-on perspective view of an embodiment of the present invention in close proximity to a surface.

The reflector 120 must be durable, washable, and efficiently reflect a broad band of UV light. The preferred embodiment is an ellipsoid of aluminum with a silicon dioxide overcoat, such as illustrated in FIG. 4. Typically, the overcoat material is vapor deposited onto the reflective surface. As illustrated in FIGS. 2 and 4, the reflection may be arranged to provide either a side or end-on configuration.

Assuming a paint removal rate of 25 square feet per minute at 3 mils thickness of removal as an example, the present invention further comprises a debris containment system 130 capable of an airflow of generally 3,500 cubic feet per minute. System 130 efficiently removes the effluvients, by trapping, compressing and storing the stripped toxic particulates.

A encasement device 140 may be added to the present invention which seals off the immediately work area optically, acoustically, and mechanically, which allows other maintenance work to proceed without endangering maintenance personnel, and further safely captures the effluence. The gas 17 within the encasement 140 may be helium so as to avoid loss of UV light absorption within air. The encasement 140 may be a contourable hood generally extending form the pinchlamp 10 to the work surface 210. It may comprise of rigid or flexible material for example, ceramic, fiberglass, rubber and flexible plastic. The hood 140 also aids in containing waste and the debris collection system 130.

Figure 3:
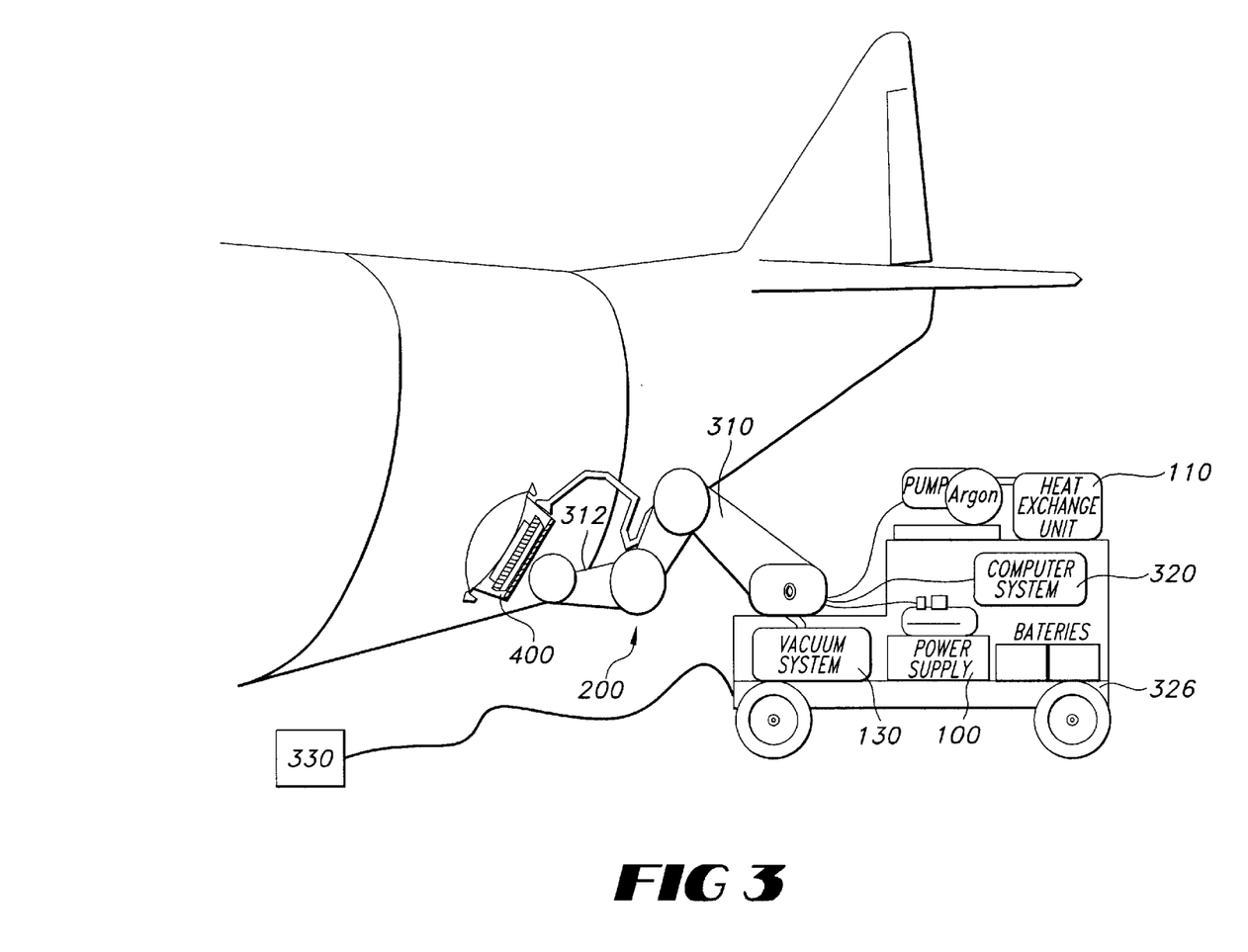
FIG. 3 shows a perspective view the present invention on a larger scale including presently preferred positioning system to place the pinchlamp in close proximity to a given surface.

The present invention may further comprise a positioning system 200, for increased efficiency, safety and economy. The positioning system 200 preferably incorporates a manipulator 310, a computer system 320, a base 326 that supports all the direct support systems for the pinchlamp 10, and a control system 330 based on hybridization of model-based and sensor-based machine-vision control.

The manipulator 310 has, preferably, at least 7 degrees of freedom not counting the base 326 which will provide another 3 degrees of freedom. The manipulator 310 may be both manually and computer controlled with the built-in capability of being totally controlled by the computer system 320 and over-rideable at all times by a human observer.

The positioning system provides the pinchlamp at a standoff distance of greater than 1 cm from the surface to be treated but no further than 1 meter. The preferred distance is about 10 cm.

The computer system 320 is preferably a PC-based, -486 or -586 processor with sufficient RAM and hard storage memory to meet the present invention's requirements. The computer system 320 may further comprise an end-of-charge indication to avoid fault, and a snubber circuit to avoid damage to the power supply 100 and reversal in plasma discharge, a common occurrence with such circuitry. Additionally, this system 320 controls the laser system 24.

The positioning system 200 may further comprise a mobile base 326 capable of supporting all the direct support systems or conduits to and from components of the direct support systems for the pinchlamp device 10 of the present invention. The mobile base 326 is equipped with sensors for automated override of manual or computer controlled positioning when a danger to the continuing removal process arises. The automated obstacle avoidance will assure safety of personnel and equipment.

The positioning system 200 of the present invention may further comprise a fully integrated control system 330 which is based on hybridization of both model-based and sensor-based control for automated path planning with optical avoidance. The control system 330 can simultaneously control all actuators including those associated with the sensors on both the end effector 400 and arm 312, and can fully integrate the generation and execution of control commands emanating from an automated model-based planning system and a real-time "re-planner" resulting from real-time sensor arrays.

It will be apparent to those skilled in the art that the present invention is applicable to a wide range of usages, including the initiation of bio-catalyst reactions and the photocuring of surfaces, and is not limited to the present preferred embodiments.

Operation of the Pinchlamp

In use, the pinchlamp 10 is a unique flash generator capable of placing a radiant power of 100 MW on target spots in the range of 1–10 square centimeters, preferable 1.2 square centimeters, with a pulse length in the range of 1–20 microseconds. In contradistinction to the laser 27, the light emitted is incoherent, therefore free of non-uniformity effects of detraction, and has an approximate black body spectrum that sweeps from a temperature of 5 eV to less than 2 eV during the temporal evolution of the pulse. Although the plasma pinch itself produces several kilojoules of radiant energy, only 1–2 kilojoules at wavelengths longer than the 150 nm cut off of the cylinder wall 14 emerges from the pinchlamp for utilization.

The present invention is capable of a repetition rate of approximately 5–10 Hz/sec, and is further capable of several times that before cooling becomes a serious limitation. A high repetition rate is particularly desirable in the area of coating removal as a large quantity to energy may be applied to the surface.

Pulse reproducibility, in terms of shape, energy, and spectrum is extremely good. The source has the form of a straight cylinder with a radius of approximately 1–2 mm and a 5 cm length. The small transverse dimension makes practical the use of focusing optics to highly concentrate light at the target position. If the diameter of the laser beam is less than approximately 3 mm, it could damage the window 12.

The beam from a small external laser 24 is introduced into the high-pressure argon gas, between preferably 1–4 atm, of the pinchlamp 10 in order to generate an ionization track down the axis of the pinchlamp 10. As soon as the initial ionization column is formed, electrical current from the high-voltage power supply 100 begins flowing along this path. This electrical-current surge heats the ionized channel and produces additional ionization so that still more current can flow in response to the reduction in plasma resistivity. As the plasma increases in temperature, it will tend to expand and cool. However, the inertia of the heavy surrounding gas in which it is embedded, together with the magnetic pinch effect, impede the expansion. Thus, the only path available to the plasma for cooling itself is through the emission of optical radiation.

An essential feature of the plasma column produced by the breakdown of the high-pressure gas is that it is optically thick during most of the current pulse. This results in its luminous spectrum being the characteristic blackbody continuum, and gives the plasma the highest brightness that could possibly be obtained for a given temperature.

As long as the condition of optical thickness is maintained, radiation of the blackbody spectrum is from the outer surface of the cylinder and is independent of changes in the plasma density. The increasing radius results in a proportional increase in the total radiated power. The small magnitude of the electrodynamic force also renders this discharge effectively free of the hydrodynamic instabilities that have usually limited the life time of prior art devices. The high-pressure embedded pinch of the present invention remains straight during the entire applied current pulse.

In preferred form, the present invention comprises a helium gas flow between the surface 210, and the pinchlamp device 10. The UV 20 passes through the helium to the surface. Helium is preferable to air, allowing twice as much UV energy to strike the surface. Although helium is preferred, other gases, including but not limited to hydrogen, argon, neon, nitrogen, carbon monoxide and air may be used.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A process for treating surfaces, said process comprising the steps of:
    (a) providing a laser-guided gas-embedded pinchlamp device having a gas contained in a chamber;
    (b) positioning said laser-guided gas-embedded pinchlamp device in proximity to the surface to be treated;
    (c) activating said laser-guided gas-embedded pinchlamp device to cause pulses of radiated energy to emit therefrom and degradation of an outer layer of the surface as a result of the light emission; and
    (d) cooling said chamber between each pulse with recirculating coolant.

2. A process according to claim 1, further comprising the step (e) of removing paint from the surface.

3. A process according to claim 1, further comprising the step (e) of providing a debris collector for removing debris produced by the pulses of radiated energy.

4. A process according to claim 3, wherein said step (e) of providing a debris collector includes helium as a flowing cover gas.

5. A process according to claim 1, further comprising the step of providing a reflector for directing at least a portion of the emitted energy of the laser-guided gas-embedded pinchlamp device towards the surface.

6. A process according to claim 3, wherein said step (e) of providing a debris collector includes a housing to encase said laser-guided gas-embedded pinchlamp device.

7. A process according to claim 1, wherein said pinchlamp device is positioned within about one meter of the surface.

8. A process according to claim 1, further comprising the step (e) of providing an electromechanical positioning device for positioning said laser-guided gas-embedded pinchlamp device in close proximity to the surface to be treated.

9. A process according to claim 1, wherein said chamber comprises a sapphire window.

10. A process according to claim 1, wherein said said step (d) of cooling said chamber between each pulse recirculates the recirculating coolant through a pump and a heat exchanger.

11. A process according to claim 1, wherein said pinchlamp has a repetition rate greater than 3 Hz.

12. A process according to claim 10, wherein said step (d) of cooling said chamber between each pulse uses flowing Argon gas at a rate of approximately 10 cubic feet per minute.

13. A process for treating surfaces, said process comprising the steps of:
  (a) providing a laser-guided gas-embedded pinchlamp device having an anode and a cathode between which current is transmitted, the anode having a hole;
  (b) positioning said laser-guided gas-embedded pinchlamp device in proximity to the surface to be treated; and
  (c) activating said laser-guided gas-embedded pinchlamp device to cause pulses of radiated energy to emit therefrom, the pulses degrading an outer layer of the surface as a result of the light emission;
  wherein the anode having the hole enables the emission of electrons upon impact with the cathode, producing sparks,. and therefore further stimulating the transmission of current and the generation of the pulses without resort to a switch.

14. An apparatus according to claim 13, wherein the pinchlamp device includes an elongated chamber, a gas within the chamber, electrodes attached to opposite ends of the chamber for generating electric voltage there across in order to conduct a current there across, and an attached guide laser utilized in conjunction with the chamber for generating a plasma pinch with the chamber.

15. An apparatus according to claim 14, wherein said chamber comprises a sapphire window.

16. An apparatus according to claim 13, wherein said pinchlamp has a repetition rate greater than 3 Hz.

17. An apparatus according to claim 13, wherein said pinchlamp has a repetition rate between about 5 and 10 Hz.

18. A process according to claim 13, further comprising the step (d) of removing paint from the surface.

19. A process according to claim 13, further comprising the step (d) of positioning said pinchlamp device within about one meter of the surface.

* * * * *